April 7, 1931.  H. C. SUEKERT  1,799,768
DIRECT WATER COOLING SYSTEM
Filed Sept. 17, 1926   4 Sheets-Sheet 1
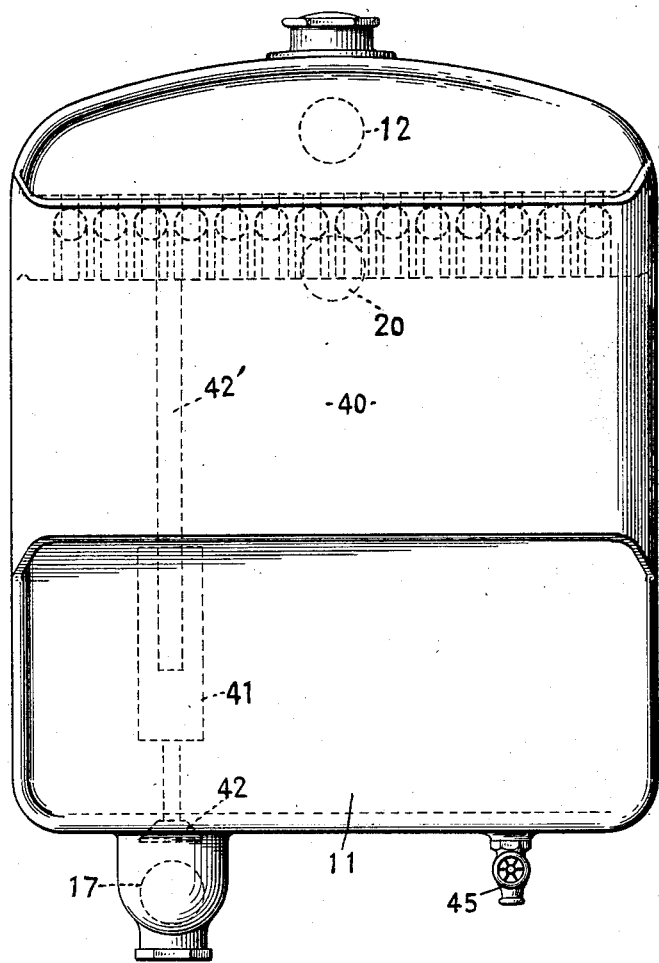
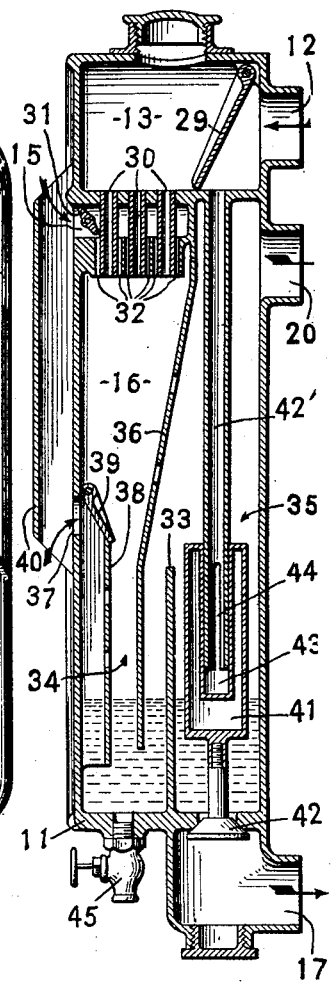
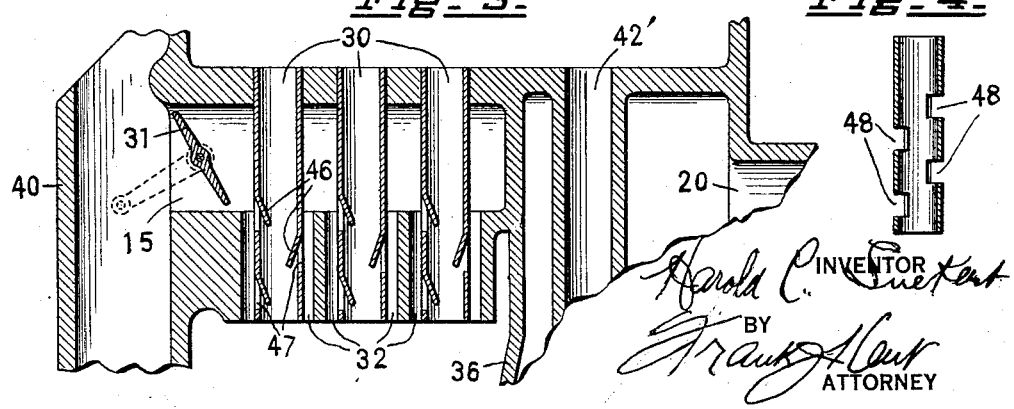

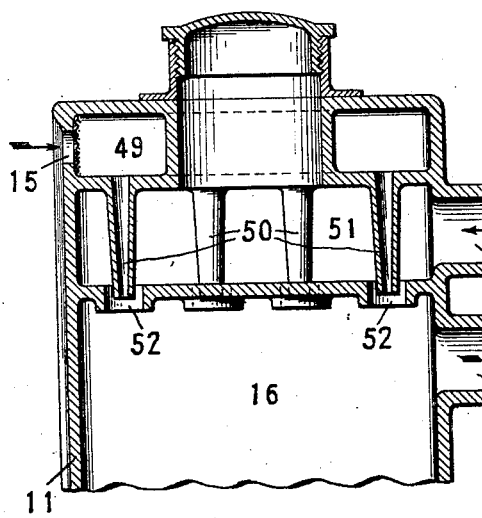
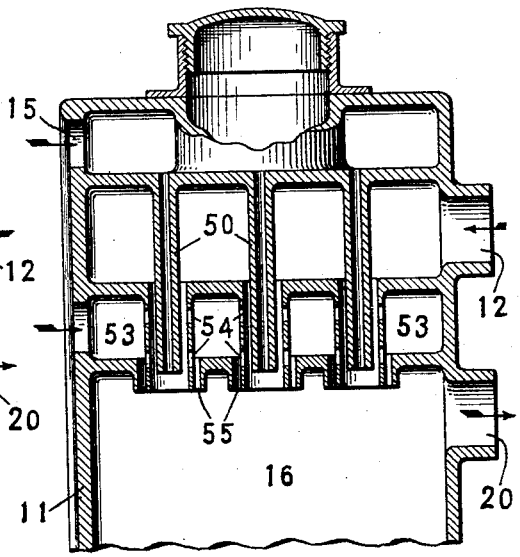
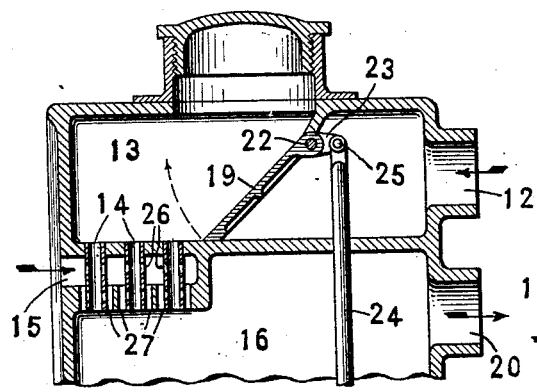
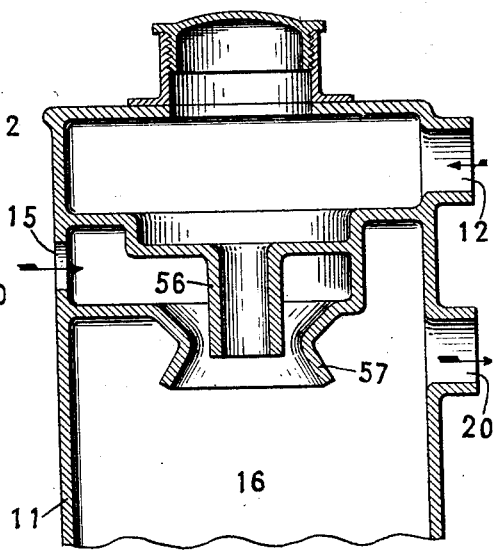

April 7, 1931. H. C. SUEKERT 1,799,768
DIRECT WATER COOLING SYSTEM
Filed Sept. 17, 1926 4 Sheets-Sheet 3
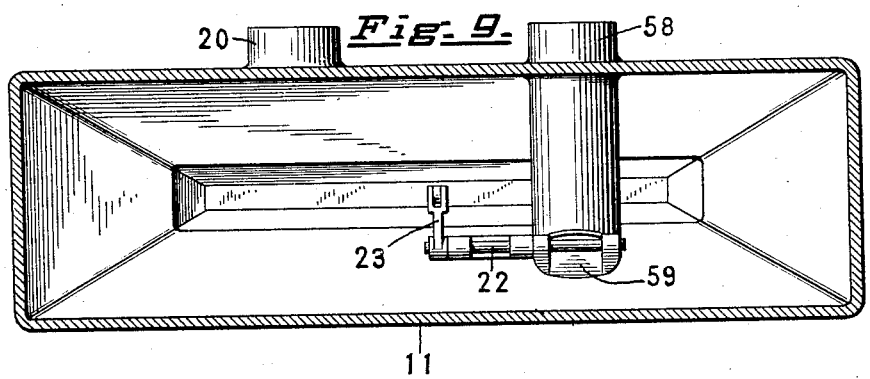
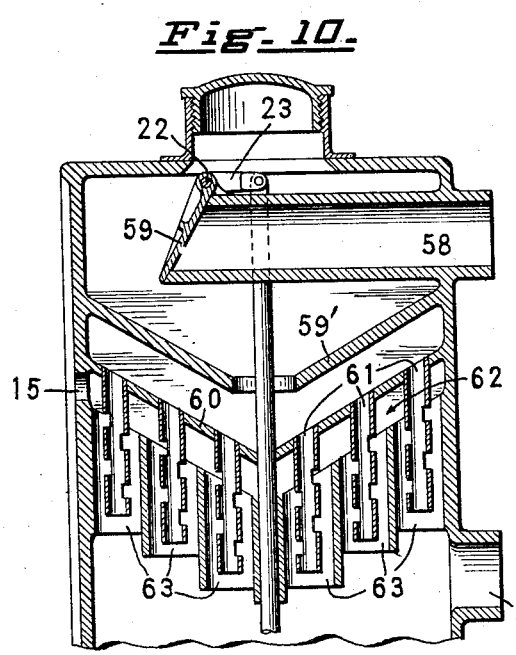
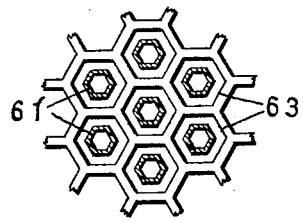
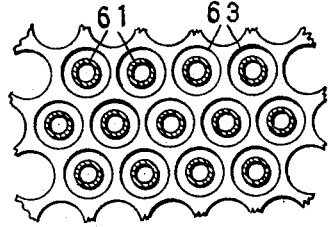
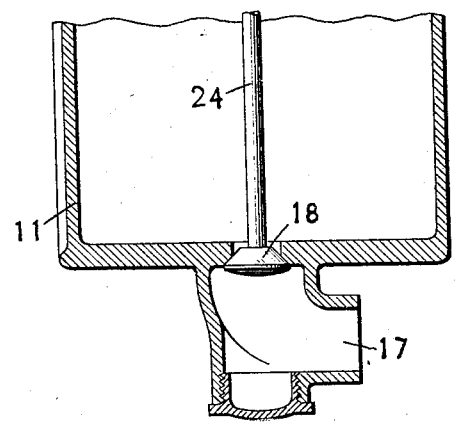

Patented Apr. 7, 1931

1,799,768

UNITED STATES PATENT OFFICE

HAROLD C. SUEKERT, OF NEW YORK, N. Y., ASSIGNOR TO HIMSELF AND FRANK J. KENT, OF NEW YORK, N. Y.

DIRECT WATER-COOLING SYSTEM

Application filed September 17, 1926. Serial No. 136,037.

This invention relates to a system for cooling the water circulated through the jacket of a water-cooled internal combustion engine, and aims to provide a system in which the water is cooled directly instead of indirectly as in the ordinary practice. This direct method increases greatly the efficiency of the cooling system and provides a means for keeping the engine temperatures within efficient limits even under the most adverse conditions, as well as reducing the size and weight of the cooling system.

It is a further object of the invention to provide an arrangement in combination with the cooling system whereby the entire air supply for the carbureter is drawn through the water being cooled in the radiator. This operation washes and humidifies the air supply and insures clean air and maximum combustion efficiency.

While I have disclosed preferred forms of my invention for purposes of illustration it should be understood that various changes may be made in the structure without departing from the spirit and scope of the invention hereinafter set forth and claimed.

In the drawings:

Fig. 1 is a front elevation of a radiator embodying my invention;

Fig. 2 is a longitudinal section through the radiator of Fig. 1;

Fig. 3 is a detail view showing a modified type of water tube;

Fig. 4 is a detail view showing another type of water tube;

Fig. 5 is a fragmentary section showing a modified arrangement of the passages in the upper part of the radiator;

Fig. 6 is a view similar to Fig. 5 showing a further modification;

Fig. 7 is a longitudinal sectional view showing a modified structure for controlling the outlet from the radiator;

Fig. 8 is a view similar to Fig. 5 showing a further modification;

Fig. 9 is a section on the line 9—9 of Fig. 10;

Fig. 10 is a longitudinal section through a modified type of radiator;

Figs. 11 and 12 are fragmentary views showing modified types of water tubes;

Fig. 13 is a diagrammatic view showing the cooling system as applied to an internal combustion engine;

Figure 14:
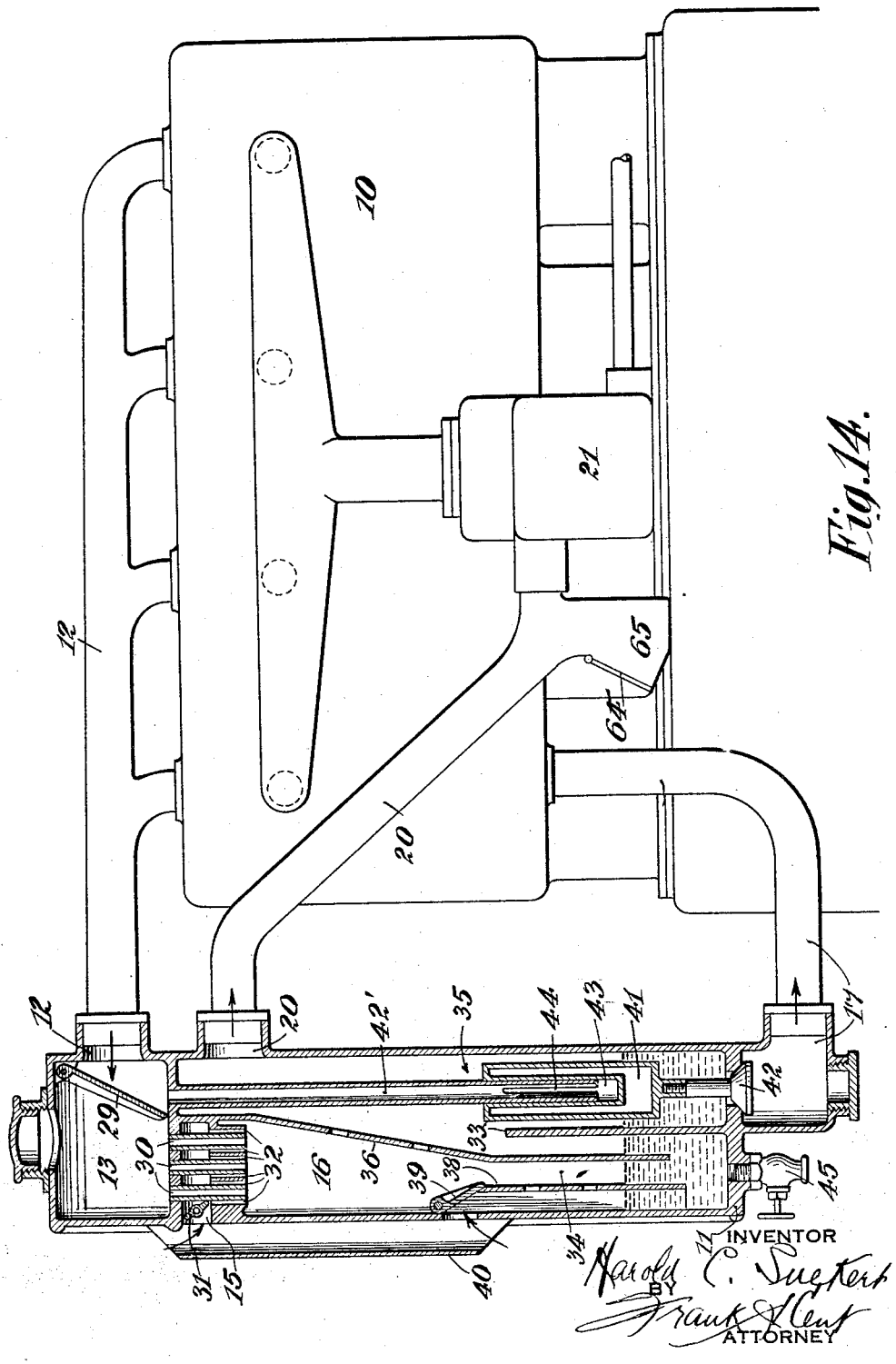
Fig. 14 is a view similar to Fig. 13 but showing in section the details of the radiator.

In the ordinary type of cooling system widely in use the water, after becoming heated by circulating through the water jacket of the engine, is passed through a radiator of the tubular or cellular type in which the hot water passes through small tubes of thin metal, the heat being dissipated through the walls of the tubes to the air passing around the tubes. This method involves loss of efficiency on account of the indirect transfer of the heat from the water through the metal to the air, and as a result the water leaves the radiator and returns to the engine at a relatively high temperature.

In applicant's system the hot water after leaving the engine jacket passes into a radiator where it is divided into fine streams and brought into direct contact with the cooling air, thereby bringing about a direct exchange of heat from the water to the air. The water thereafter leaves the radiator at a cooler temperature than in the ordinary system of cooling.

Referring to Fig. 13, which shows in a diagrammatic way the main features of my system, the engine block is shown at 10 and the radiator at 11. The water, after circulating through the water jacket of the engine block, passes through the hose 12 into the upper chamber 13 of the radiator. As it leaves the chamber 13 through the tubes 14 it draws air with it through the air inlet 15 and falls in the form of a fine spray through the air space 16. The cooled water thereafter collects in the bottom of the radiator and is returned to the engine by a pump in a well-known manner by way of the hose 17. In order to keep the water from flowing back from the engine jacket through pipe 17 into the air space 16 when the engine is idle, a valve 18 is provided to close this passage. When the engine is running the pressure of water passing into the radiator opens flap valve 19, which movement opens valve 18.

An air passage 20 opens from the upper part of the rear side of the radiator and leads to the air intake of the carbureter 21. In this manner all of the air passing into the engine is washed free of dust by passing through the water spray in the air chamber 16. Also, the air passing to the carbureter will carry along with it the water vapor released in the chamber 16, and this vapor will assist in the operation of the engine in a manner understood by those skilled in the art.

The type of radiator illustrated diagrammatically in Fig. 13 is shown more in detail in Fig. 7. The water entering through port 12 opens the flap valve 19, which is hinged at 22 and carries an arm 23 to which the stem 24 of valve 18 is pivoted at 25. After passing valve 19 the water enters the upper chamber 13 from which it flows downwardly through tubes 14, drawing air through the inlet 15. Part of the air passes into the tubes 14 through the holes 26 and the remainder passes through the apertures 27 surrounding the tubes 14, so that air commingles with the water in tubes 14 and flowing air surrounds the jets as they issue into chamber 16 in the form of a spray. The water in this finely divided condition becomes thoroughly aerated and cooled as it falls through the air chamber 16, from whence it flows past valve 18 into the outlet 17. A spring 28 is provided to bias the valve 18 toward closed position, which spring closes the valve when the motor stops running and the pump ceases to force water through the inlet and against the flap valve 19.

In the modification shown in Fig. 1 the water enters through port 12, pushes past a pivoted flap valve 29 and enters the chamber 13, from which it flows through tubes 30 into air chamber 16. The air is taken in through port 15 past the control valve 31 and enters chamber 16 through apertures 32 surrounding the tubes 30. A lateral partition 33 extends across the bottom of the radiator and divides it into a forward collection compartment 34 and a rear discharge compartment 35. A perforated apron 36 is secured to each side of the radiator and extends from a point behind the tubes 30 to near the bottom of the collection compartment. The apron keeps water from passing directly into the air outlet 20.

The valve 31 can be suitably controlled to reduce the cooling effect of the radiator in cold weather, and an auxiliary air inlet 37 opens into the lower part of chamber 16. An apertured plate 38, which is placed behind the front wall of the radiator with its upper part opposite the inlet 37, projects downwardly toward the bottom of the compartment 34. A valve 39 is pivoted to the front radiator wall above the inlet 37, and meets the top of plate 38 to form a closed space. Normally an auxiliary supply of air enters the inlet 37 and flows to the carbureter, passing through the apertures of plate 38 and around the bottom thereof. When the valve 31 is restricted to reduce the cooling effect of the radiator, the suction of the engine opens valve 39, thereby admitting an increased supply of air. The air for the carbureter normally passes through the perforations of apron 36, but when the carbureter suddenly increases its demand for air an additional amount of air will pass under the shield and through the water in the collection chamber. A shield member 40 covers the air inlets 31 and 37 and prevents the intrusion of injurious articles into the inlets.

When the water in chamber 34 overflows into the discharge compartment 35 it collects and raises the float 41 to close the valve 42 as shown in Fig. 2. This is the normal position of the parts when the engine is at rest. A tube 42' projects downwardly from the entrance chamber of the radiator and fits closely within a cylinder 43 formed in the float. As the water enters through inlet 12 the flap valve 29 causes a back pressure down tube 42', which pressure operates to press the float 41 downwardly and open valve 42. As the float 41 moves downwardly it uncovers the slot 44 in the side of tube 42' and relieves the pressure therein. A drain valve 45 is provided for draining chamber 34.

In Fig. 3 the tubes 30 are shown as having tongues 46 struck therein to provide apertures 47 for the entry of air into the tubes, the tongues further providing turbulence for intimately mixing the air with the water. In Fig. 4 apertures 48 are cut in staggered relation into opposite sides of the tubes 30 to permit access of air into the tubes.

Figs. 5, 6 and 8 illustrate various ways in which the air and water passages in the upper part of the radiator may be constructed. In Fig. 5 the air flows through the inlet 15 into an air chamber 49 and thence downwardly through nozzles 50 into the chamber 16. The water enters through inlet 12 into the chamber 51 and runs into the chamber 16 through nozzles 52 surrounding the air nozzles 50, being thereby projected into the chamber 16 in hollow streams with cool air flowing down the center thereof. Fig. 6 shows substantially the same arrangement except that a second air chamber 53 is formed below the water chamber 51 and the water nozzles 52 are prolonged to extend through chamber 53 and are apertured at 54. As the water passes through the nozzles 52 it is cooled by a central stream of air projected by the prolonged nozzles 50 into the center of the water stream, as well as by air entering the water stream through apertures 54 and by the air stream issuing from the nozzles 55 and surrounding the water stream.

In the modification of Fig. 8 the water passes down through nozzles 56 and air is drawn around the water and through the Venturi tube 57 surrounding the nozzle. This structure increases the velocity of the air and hastens the breaking up of the water stream.

In the species illustrated in Figs. 9 and 10 the water enters by a tube 58 projecting into the radiator and operates a flap valve 59 similar to the valve 19 of Fig. 7. After issuing from the tube 58 the water passes through a partition 59′ shaped like an elongated funnel and thence to the V-shaped partition 60 which has water nozzles 61 of the kind shown in Fig. 4 set therein at spaced intervals over its entire surface. An inlet 15 admits air to the chamber 62 and an air nozzle 63 surrounds each water nozzle 61. And air passage 20 opens below the nozzles 63 and conducts humidified air to the carbureter. It will be clear from Figs. 11 and 12 that the nozzles 61 and 63 may be made round, hexagonal, or any other suitable shape. In this type of radiator when the engine is running slowly the water will pass through the water nozzles near the bottom of the partition 60, and as the engine speeds up and a greater volume of water is discharged from the tube 58, the water will rise toward the sides of partition 60, thereby bringing a greater number of water nozzles into play. At the same time more air is drawn in by the engine suction, and therefore the increased number of water nozzles in use together with the increased air intake augments the cooling capacity of the radiator. The provision of the partition 60 with water nozzles over its entire surface makes possible the use of the maximum number of water nozzles.

In some cases it may be found desirable to place in the air intake 20 a water collection chamber 65 provided with a valve 64 which permits the collected water to escape, but which does not allow air to pass in toward the carbureter.

I claim:—

1. A cooling system for internal combustion engines comprising an engine, a water jacket surrounding the cylinders of the engine, a radiator connected to the water jacket, a water chamber in the upper part of the radiator, an air chamber below the water chamber, a plurality of apertures adapted to deliver water from the water chamber to the air chamber, an air inlet leading into the air chamber, and a conduit leading from the upper part of the air chamber and adapted to deliver humidified air to the carbureter of the engine.

2. A cooling system for internal combustion engines comprising an engine, a water jacket surrounding the cylinders of the engine, a radiator connected to the water jacket, a water chamber in the upper part of the radiator, an air chamber below the water chamber, a plurality of apertures adapted to deliver water from the water chamber to the air chamber, an air inlet leading into the air chamber, a valve adapted to restrict the air inlet, an auxiliary air inlet leading into the air chamber, and a conduit leading from the air chamber and adapted to deliver humidified air to the carbureter of the engine.

3. A cooling system for internal combustion engines comprising an engine, a water jacket surrounding the cylinders of the engine, a radiator connected to the water jacket, a water chamber in the upper part of the radiator, an air chamber below the water chamber, a plurality of apertures adapted to deliver water from the water chamber to the air chamber, an air inlet leading into the air chamber, a conduit leading from the air chamber and a perforated apron extending across the air chamber between the apertures and the conduit.

4. A cooling system for internal combustion engines comprising an engine, a water jacket surrounding the cylinders of the engine, a radiator connected to the water jacket, a water chamber in the upper part of the radiator, an air chamber below the water chamber, a delivery chamber in the lower part of the radiator, a float valve controlling outflow from the delivery chamber, and means responsive to pressure in the water chamber for opening the float valve.

5. A cooling system for internal combustion engines comprising an engine, a water jacket surrounding the cylinders of the engine, a radiator connected to the water jacket, a water chamber in the upper part of the radiator, an air chamber below the water chamber, a delivery chamber in the lower part of the radiator, an outlet valve controlling outflow from the delivery chamber, a flap valve moved by pressure of water coming into the water chamber, and a connection causing movement of the flap valve to control movement of the outlet valve.

6. A cooling system for internal combustion engines comprising an engine, a water jacket surrounding the cylinders of the engine, a radiator, a water chamber in the upper part of the radiator, a conduit connecting the water jacket to the water chamber, an air chamber in the radiator below the water chamber, the bottom of the water chamber being apertured to permit passage of water from the water chamber to the air chamber, an air inlet leading into the air chamber, a delivery chamber in the radiator below the air chamber, and a conduit connecting the delivery chamber to the water jacket.

7. A cooling system for internal combustion engines comprising an engine, a water jacket surrounding the cylinders of the engine, a radiator, a water chamber in the upper part of the radiator, a conduit connecting the water jacket to the water chamber, an air chamber in the radiator below the water chamber, the bottom of the water chamber being formed with a plurality of apertures to permit passage of a plurality of streams of water from the water chamber to the air chamber, an air inlet leading into the air chamber, a delivery chamber in the radiator below the air chamber, and a conduit connecting the delivery chamber to the water jacket.

8. A cooling system for internal combustion engines comprising an engine, a water jacket surrounding the cylinders of the engine, a radiator, a water chamber in the upper part of the radiator, a conduit connecting the water jacket to the water chamber, an air chamber in the radiator below the water chamber, a collection chamber at the bottom of the radiator, a conduit connecting the delivery chamber to the water jacket, a valve controlling flow through said last-named conduit, said valve being controlled by the pressure of water in the water chamber.

9. A cooling system for internal combustion engines comprising an engine, a water jacket surrounding the cylinders of the engine, a radiator, a water chamber in the upper part of the radiator, a conduit connecting the water jacket to the water chamber, and adapted to carry water from the water jacket to the water chamber when the engine is running, an air chamber in the radiator below the water chamber, a collection chamber at the bottom of the radiator, a conduit connecting the collection chamber to the water jacket, a valve controlling flow through said last named conduit, and means for closing the valve when water ceases to enter the water chamber from the water jacket.

10. A cooling system for internal combustion engines comprising an engine, a water jacket surrounding the cylinders of the engine, a radiator, a water chamber in the upper part of the radiator, a conduit connecting the water jacket to the water chamber, an air chamber in the radiator below the water chamber, a plurality of nozzles opening from the water chamber into the air chamber for delivering jets of water into the air chamber, an air inlet, an air nozzle surrounding each water nozzle to deliver a stream of air surrounding each water jet, a delivery chamber in the radiator below the air chamber, and a conduit connecting the delivery chamber to the water jacket.

In testimony whereof I affix my signature.

HAROLD C. SUEKERT.